March 26, 1935.  C. GEBHARD  1,995,344
ANIMAL TRAP
Filed Nov. 3, 1933
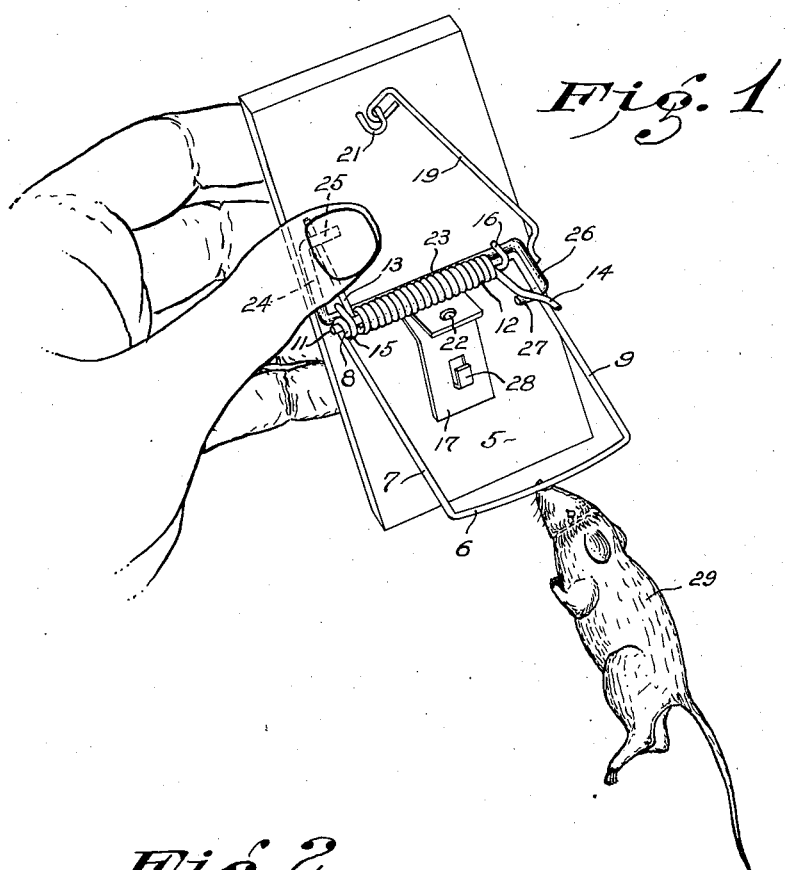
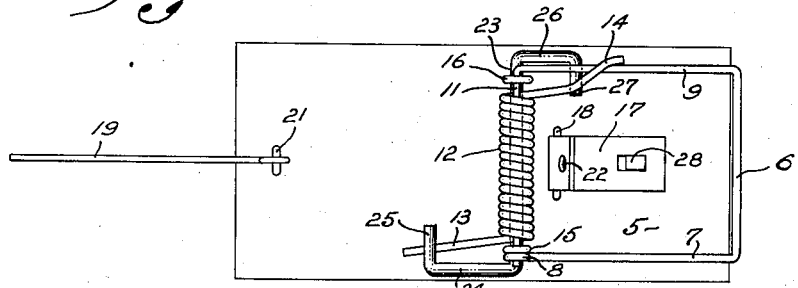
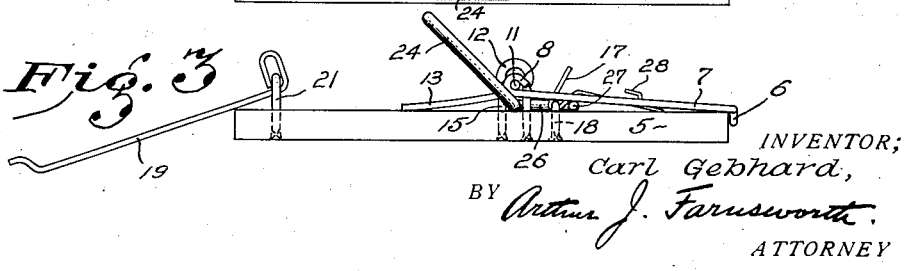
INVENTOR;
Carl Gebhard,
BY Arthur J. Farnsworth
ATTORNEY Patented Mar. 26, 1935

1,995,344

UNITED STATES PATENT OFFICE 1,995,344

ANIMAL TRAP

Carl Gebhard, Los Angeles, Calif.

Application November 3, 1933, Serial No. 696,567

1 Claim. (Cl. 43—81)

My invention relates to improvements in animal traps of the spring-constrained jaw type, and particularly to traps of this kind that are adapted for catching small animals such as rats and mice. Among the salient objects of the invention are: first, to provide improved means for releasing an animal caught in such a trap, so that there will be no necessity for contacting it; second, to supply means that assist in opening the jaws of such a trap, for the purpose of setting the same; and, third, to accomplish these and related objects by very simple and inexpensive construction.

It will be appreciated that, particularly in the case of traps for catching rats and mice, it is very desirable to be able to dispose of the animal after it has been killed by the trap, without touching the same; and without handling portions of the trap that may have become fouled, by reason of the bleeding of the animal or otherwise. My device is applicable to many standard kinds of animal traps for accomplishing these objects.

For the purpose of disclosing my invention, I have illustrated its application to a standard type of mouse trap. In the accompanying drawing—

Figure 1 is a perspective view of a mouse trap of this kind, to which my invention has been applied, showing how it may be grasped in the hand and be operated by the thumb, so as to open the jaws and release an entrapped animal, without touching the animal or any portion of the trap that is likely to be fouled;

Figure 2 is a plan view of said trap construction by itself; and

Figure 3 is a side elevation of the construction illustrated in Fig. 2.

Similar reference numerals refer to similar parts throughout the several views.

Passing to a detailed description of my invention as it has been illustrated, the base of the trap may consist of a small block or wood, or other suitable material, illustrated at 5. A wire bail 6 constitutes one of the jaws of the trap, the cooperating jaw being the end of base 5 that is opposed to the bail. A side bar 7 of the bail, has a loop 8 formed at its extremity. The other side bar 9 is originally cut longer than side bar 7, so that a considerable length at the end thereof may be bent at right angles to form an integral pivot pin 11 passing through loop 8. The intermediate portion 6 of the bail functions to catch and/or kill small animals.

A helical torsion spring 12 loosely surrounds pivot pin 11, and is positioned thereby. One end of this spring has a laterally extending extremity 13 engaging the upper surface of base 5; and the other end of the spring has a laterally extending extremity 14, suitably bent to engage side bar 9 of the jaw bail. At the time that the parts of the trap are assembled, spring 12 is "wound up" sufficiently to insure that the jaw bail will normally be pressed against the base with sufficient force to hold and/or kill an entrapped animal.

As stated above, pivot pin 11 is passed through the helical torsion spring and loop 8. A pair of staples, 15 and 16, are placed over pin 11 near its respective extremities, and are driven into base 5 for holding all of the described parts in proper cooperative relation, after spring 12 has been "wound up" to apply the desired closing pressure to the jaw bail.

A well known type of bait-holding trigger 17 is shown as being pivotally mounted upon the right-hand end of base 5, by means of a staple 18. In this position it is within the jaw bail when the latter is in its closed position. A catch-bar 19 is attached to the left-hand end of the base by means of a staple 21. This bar is adapted to hold the jaw-bail in its fully open or "set" position, at the left-hand end of the base, by being pressed over jaw bar 6 and by having its free extremity inserted in hole 22 of trigger 17.

All of the above described construction is well known to the art, and it has been set forth herein only for the purpose of making plain how my invention may be applied thereto.

In standard traps of the kind that have been described, the parts are loosely fitted together, and there is ample room for inserting an additional wire element through staples 15 and 16, or through the center of helical torsion spring 12. If sufficient space for the purpose is not in fact provided in standard trap construction, it can be easily secured by raising the staples 15 and 16 from the base a slight distance, or by utilizing a new pair of longer staples.

I have utilized this principle for positioning the very simpe trap-releasing lever which constitutes my invention. This is made of a piece of stiff wire having a straight intermediate portion 23 passing through staples 15 and 16 as shown, or passing through the center of the helical spring if this is preferred. In either case, sufficient space is available for accommodating both it and pivot portion 11 of the jaw bail.

One extended end of bar 23 is bent at right angles laterally to form a lever portion 24; and the extremity of this portion is again bent at right angles as shown at 25, to form a thumb grip. The other extended end of bar 23 is similarly and oppositely bent to constitute a lever portion 26 and lifting bar 27. The latter passes beneath side bar 9 of the jaw bail. Viewed from the side, as shown in Fig. 3, lever portions 24 and 26 form an obtuse angle.

Obviously the action of torsion spring 12 tends to hold jaw bail 6 in the position shown in Figs. 2 and 3, in which position it is adapted to hold an entrapped animal that has sprung the trap. The trap is sprung by the animal when he slightly moves trigger 17 in attacking the bait; the latter being attached to the trigger in any suitable manner, as by a hook 28.

Ordinarily the force of spring 12 is such that, when the trap is sprung, bail 6 will strike the animal a sharp blow on the neck or back, depending upon its size, and will thereby kill it. Naturally, bleeding or fouling of the trap may result. Moreover, certain small animals, such as rats and mice, are apt to be unclean or infected, by reason of their habits. Therefore it is very desirable to be able to release the entrapped animal without danger of touching it. For this purpose the trap, carrying the entrapped animal, is grasped by the hand as illustrated in Fig. 1, with the thumb placed upon grip portion 25 of the release lever. The trap may then be held over a garbage can or dump, and the animal be released, so as to fall clear of the trap, by depressing thumb grip 25, as indicated in Fig. 1. This has the effect of raising the jaw bail against the force of the torsion spring, and allows the animal, such as the mouse illustrated at 29, to drop clear of the trap.

It will be noted that lifting bar 27 engages side bar 9 of the bail, almost directly beneath the point where spring extremity 14 engages this bar; and that the trap-releasing lever is thus adapted to exert an opening force upon the bail that directly opposes the closing force of the spring, both of these forces being applied to the same element and in the same plane. This feature of my construction is of great practical importance, because it completely obviates any danger of exerting a deforming force upon the bail by the operation of the trap-releasing lever. For this reason the bail may be made much lighter than it would have to be if this feature was omitted.

It will be appreciated that the expense of adding my releasing lever to standard traps is so small as to be practically negligible, and that this very slight additional expense secures the very great advantage of improved sanitation in handling traps after they have caught the animals for which they were set. It will also be obvious that, with slight variations of shape or design that will readily occur to skilled persons, my invention may be applied to many forms of standard jaw traps.

Having thus fully illustrated and described my invention, I claim:

In combination with a trap having a base; a swingable jaw bail loosely positioned upon the base by staples, and adapted to cooperate with the base for seizing an animal therebetween; a spring adapted to force said jaw toward the base; and a lever that is intermediately pivoted by means of said staples; said lever having one end adapted to swing the free portion of the bail away from the base without deformation of the bail, against the force of the spring, and its other end adapted for manual operation to release an entrapped animal without contact therewith; and the points where the spring and lever act upon the bail being adjacent.

CARL GEBHARD.